United States Patent
Weng et al.

(10) Patent No.: US 8,833,395 B2
(45) Date of Patent: Sep. 16, 2014

(54) PRESSURE RELIEF VALVE

(71) Applicants: Chen-Yuan Weng, Kaohsiung (TW); Chin-Sheng Ho, Taichung (TW)

(72) Inventors: Chen-Yuan Weng, Kaohsiung (TW); Chin-Sheng Ho, Taichung (TW)

(*) Notice: Subject to any disclaimer, the term of this patent is extended or adjusted under 35 U.S.C. 154(b) by 107 days.

(21) Appl. No.: 13/647,404

(22) Filed: Oct. 9, 2012

(65) Prior Publication Data
US 2014/0096848 A1 Apr. 10, 2014

(51) Int. Cl.
*F16K 17/04* (2006.01)
*F16K 15/20* (2006.01)

(52) U.S. Cl.
USPC .......................... 137/881; 137/226

(58) Field of Classification Search
CPC ..... F16K 15/20; F16K 15/207; F16K 17/044; F16K 17/164; B60C 29/068; B60S 5/043
USPC .......................... 137/881, 223, 224, 226, 227
See application file for complete search history.

(56) References Cited

U.S. PATENT DOCUMENTS

| | | | | | |
|---|---|---|---|---|---|
| 1,713,889 | A | * | 5/1929 | Criswell et al. | 137/223 |
| 1,869,051 | A | * | 7/1932 | Davis | 137/524 |
| 5,778,923 | A | * | 7/1998 | Marston | 137/226 |
| 7,032,611 | B1 | * | 4/2006 | Sheng | 137/225 |
| 2007/0023083 | A1 | * | 2/2007 | Huang | 137/226 |
| 2008/0047613 | A1 | * | 2/2008 | Huang | 137/226 |
| 2008/0115838 | A1 | * | 5/2008 | Huang | 137/223 |

* cited by examiner

*Primary Examiner* — Elizabeth Houston
*Assistant Examiner* — Michael R Reid
(74) *Attorney, Agent, or Firm* — Leong C. Lei

(57) ABSTRACT

The present invention provides an improved pressure relief valve comprising a tubular main body with a pressure relief peroration, a pressure adjustor with an anti-leakage rubber and an anti-reverse unit; wherein the main body comprises a mount opening, an air outlet and a conduit between the air intake and outlet. The conduit comprises an abutting portion; the pressure adjustor is mounted on the air intake and the anti-reverse unit is fastened onto said outlet. As the pressure adjustor is connected to an air pump and said outlet is connected to an air-filling article, the pressure value of said article is set via the pressure adjustor. As said article reaches said pressure value, the anti-leakage rubber of the pressure adjustor is pushed such that air is released from the relief perforation and the anti-reverse unit abuts the staged portion of the conduit to maintain the article at a stabilized filling state.

4 Claims, 10 Drawing Sheets

PRESSURE RELIEF VALVE

TECHNICAL FIELD OF THE INVENTION

The present invention is related to an improved pressure relief valve, in particular, to an improved pressure relief valve provided for connecting with an air pumping device and air filled article to preset a pressure value of the air-filling article such that as the air-filling article reaches the preset pressure value, the air can be released from the pressure relief valve thereof in order to keep the air-filling article filled with air at a stable pressure.

DESCRIPTION OF THE PRIOR ART

For conventional tires of vehicles including such as bicycles, the air intake of the air-filling articles of the tires is normally connected to an air pumping device via a pipe such that the air can be pumped into the tire. Due to the different elastic properties of the tires to be filled with air vary from one another and since the pressure value of the filled tire cannot be immediately known to users, in order to maintain a proper tire pressure that is neither too great or less, the users often use hands or pressure gauges at the air intakes of the tires to measure the tire pressure, which can be inconvenient to the users performing such operations. In addition, although most air pumping devices are equipped with pressure gauges, the values shown by the pressure gauges are often for reference only and cannot accurately display the pressure measured. In view of the drawbacks of the known arts and after years of research and development in the field, the inventor seeks to provide an improved pressure relief valve to overcome the drawbacks such that air in the air-filling article can be released from the pressure relief valve when the air-filling article is at a completely saturated state in order to maintain the air-filling article at a stabilized air-filling state and to facilitate the air pumping operation thereof.

SUMMARY OF THE INVENTION

The present invention provides an improved pressure relief valve to be fluidly connected between an air pumping device and an air-filing article such as tires for air filling, which also comprises a pressure adjustor for setting a pressure value of the air-filling article whereby when the air-filling article reaches said pressure value, the air is released from the main body of the pressure relief valve and the air-filling article is maintained to be at a stabilized filling state.

Accordingly, the abovementioned improved pressure relief valve comprises a main body in a tubular shape with a pressure relief peroration provided thereon, a pressure adjustor fastened onto the main body and having an anti-leakage rubber provided thereon and an anti-reverse unit; wherein the main body further comprises a mount opening, an air outlet and a conduit provided between the air intake and outlet. The conduit comprises an abutting portion. The pressure adjustor is mounted on said air intake and the anti-reverse unit is fastened onto the air outlet. As the pressure adjustor is connected to the air pumping device and the air outlet is connected to the air-filling article, the pressure value (PSI, BAR) of the air-filling article can be set via the pressure adjustor and the conduit allows for the air pressure to pass therethrough to achieve the air filling of the air-filling article. When the air pressure of the air-filling article reaches said pressure value, the feedback pressure pushes the anti-leakage rubber of the pressure adjustor such that the air is released from the pressure relief perforation of the main body and such that the anti-reverse unit abuts the staged portion of the conduit of the main body to maintain the air-filling article at a stabilized filling state.

According to the improved pressure relief valve mentioned above, wherein the air outlet of the conduit of the main body comprises a slanted section in a cone shape; the anti-reverse unit comprises a shaft mounted onto a blocker and passing therethrough; the blocker is fastened onto the air outlet; another end of the shaft comprises a conical member having an O-shaped ring; and wherein a spring is mounted between the conical member and the blocker such that the anti-reverse unit is moveable and such that the conical member blocks the slanted section to facilitate air filling or pressure relief thereof normally.

DETAILED DESCRIPTION OF THE PREFERRED EMBODIMENTS

Figure 1:
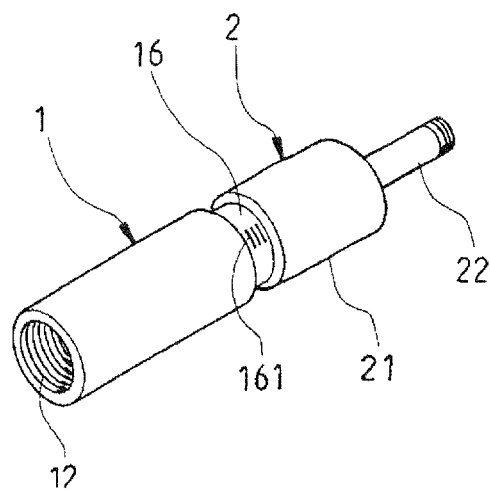
FIG. 1 is a perspective view of the improved pressure relieve valve of the present invention.
Figure 2:
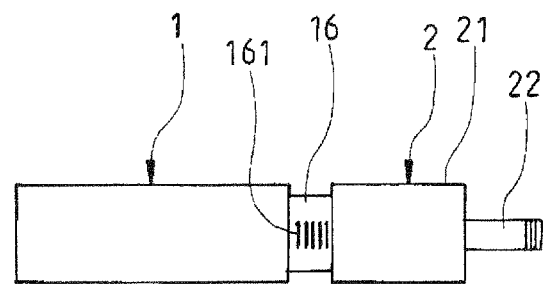
FIG. 2 is a side view of the improved pressure relieve valve of the present invention.
Figure 3:
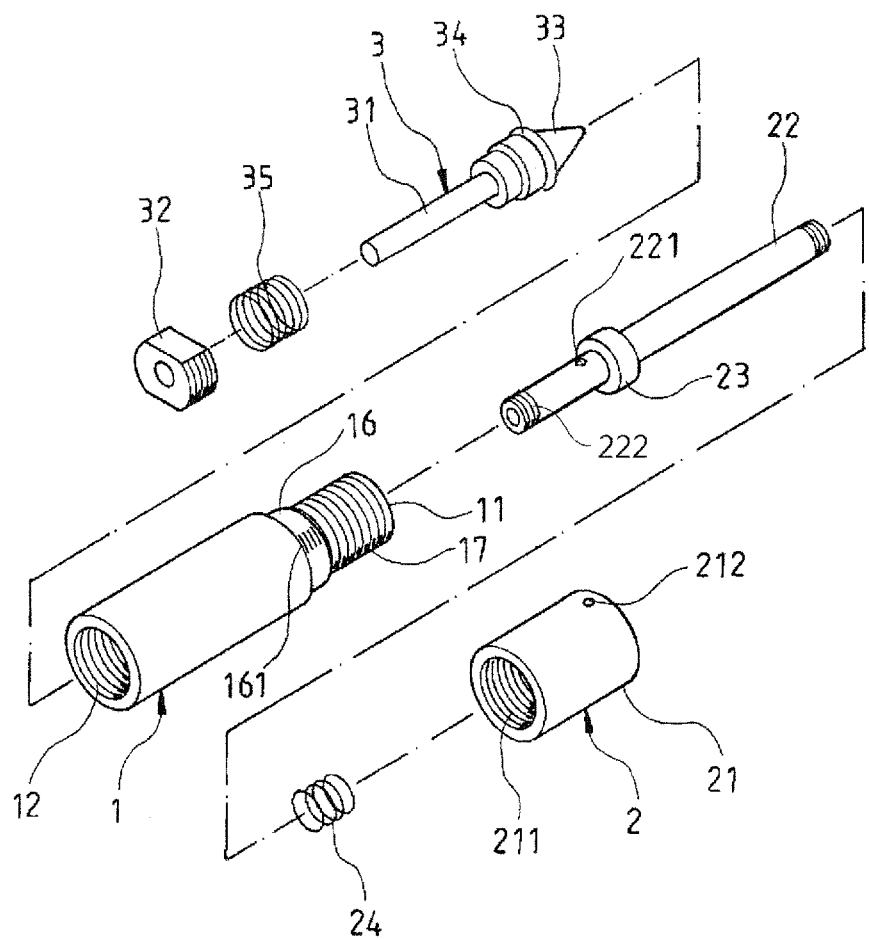
FIG. 3 is an exploded view of the improved pressure relieve valve of the present invention.
Figure 4:
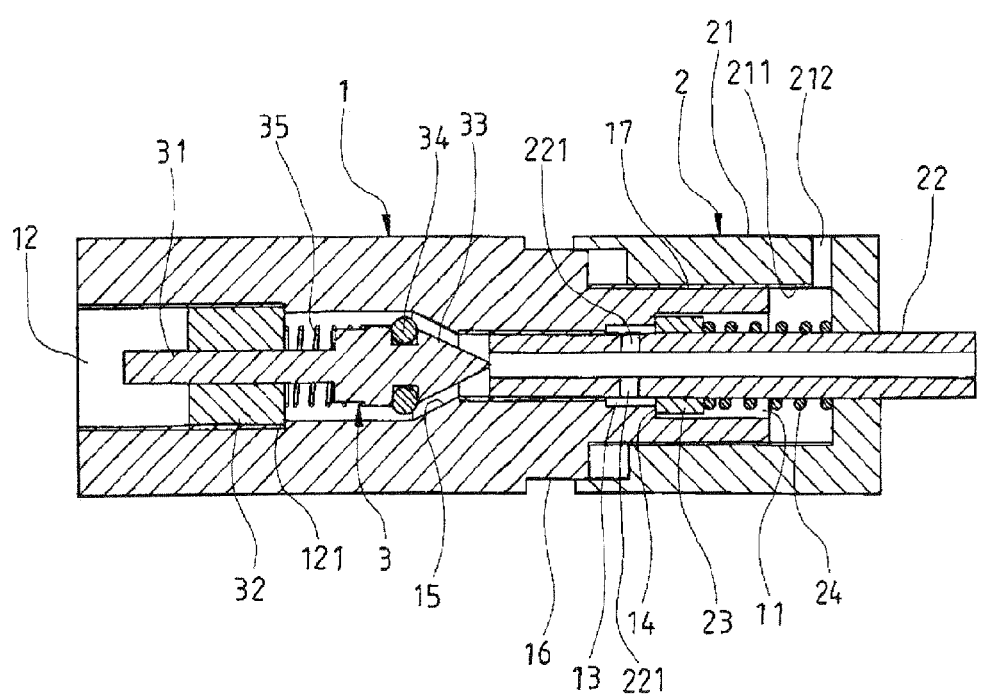
FIG. 4 is a cross sectional view of the improved pressure relieve valve of the present invention.

FIGS. 1, 2, 3 and 4 show the perspective view, side view, exploded view and cross sectional view of the improved pressure relief valve of the present invention respectively. As shown in the figures, the improved pressure relief valve of the present invention comprises a tubular main body 1, a pressure adjustor 2 and an anti-reverse unit 3. In addition, the main body 1 comprises a mount opening 11 and an air outlet 12 on two ends thereof respectively. A conduit 13 is provided between the mount opening 11 and the air outlet 12; wherein an abutting portion 14 in a staged shape is provided at a connecting end between the conduit 13 and the mount opening 11, and a slanted section 15 in a cone shape is provided at a connecting end between the conduit 13 and the air outlet 12. Furthermore, a staged portion 121 is provided between the slanted section 15 and the air outlet 12. An outer surface of the mount opening 11 of the main body 1 comprises an attachment portion 16 and a threaded portion 17 with a relatively smaller diameter; and wherein the attachment portion further comprises a scale label 161.

The pressure adjustor 2 comprises a sleeve 21 having a screw portion 211; and wherein the sleeve 21 comprises a pressure relief perforation 212, a hollow shaft 22 provided at an internal of the sleeve 21 and having a through-hole 221 penetrating a hollow portion thereof, and an anti-leakage rubber 23 attached to a front edge of the through-hole 221. In addition, a spring 24 passing through the shaft 22 is provided between a vertical wall of an inner surface the sleeve 21 and the anti-leakage rubber 23. The front end of the shaft 22 is provided with a threaded portion 222. The sleeve 21 is fastened onto the threaded portion 17 of main body 1 with the screw portion 211 such that the shaft 22 is mounted onto the mount opening 11 of the main body 1 and locked on the main body 1 by means of the threaded portion 222 thereby causing the anti-leakage rubber 23 to abut said abutting portion 14 of the main body 1.

The anti-reverse unit 3 comprises a shaft 31 penetrating a blocker 32; wherein said blocker 32 is fastened onto the air outlet 12 of the main body 1 and abovementioned staged portion 121 forms a positioning lock to prevent an over-fastening thereof. In addition, another end of the shaft 31 comprises a conical member 33 having an O-shaped ring 34, and a spring 35 is mounted between the conical member 33 and the blocker 32 such that the anti-reverse unit 3 is moveable.

In accordance with the structural configuration and assembly above, an improved pressure relief valve of the present invention is advantageously constructed; and whereby during an operation of said pressure relief valve, the shaft 22 of the pressure adjustor 2 is fluidly connected to an air pumping device and the air outlet 12 is connected to an air-filling article 80 including such as tires, and the air-filling article 80 is set by adjusting the status of the pressure relief in accordance to the pressure required by the air-filling article 80. During the adjustment thereof, the sleeve 21 can be properly rotated in a clockwise or counterclockwise direction in order to move the sleeve 21 laterally in a left/right direction along the attachment portion 16 of the main body 1 such that the spring force exerted by the spring 24 onto the anti-leakage rubber 23 can be altered in order to adjust the pressure value thereof and such that different pressure conditions are satisfied to achieve the effect of pressure relief. The adjusted value can too be visible via the scale label 161 provided on the attachment portion 16. Furthermore, under a normal condition, the anti-leakage rubber 23 of the pressure adjustor 2 blocks the abutting portion 14 of the main body 1 and an air filled by said air pumping device and entering into the hollow portion of the shaft 22 pushes the anti-reverse unit 3 in a direction toward the air outlet 12 such that an adequate gap is formed to allow the air to pass through the anti-reverse unit 3 to fill the air-filling article 80. When the air-filling article 80 reaches said pressure value, a feedback pressure pushes the anti-leakage rubber 23 of the pressure adjustor 2, which causes the abutting portion 14 to disengage from the anti-leakage rubber 23 to form a gap such that the air filled into the shaft 22 flows back via the through-hole 221 and such that the air is released from the pressure relief perforation 21 of the sleeve 21. In addition, the feedback pressure is able to push the conical member 33 of the anti-reverse unit 3 such that it abuts the slanted section 15 of the conduit 13 of the main body 1 in order to maintain the air-filling article 80 at a stabilized filling state.

Figure 5:
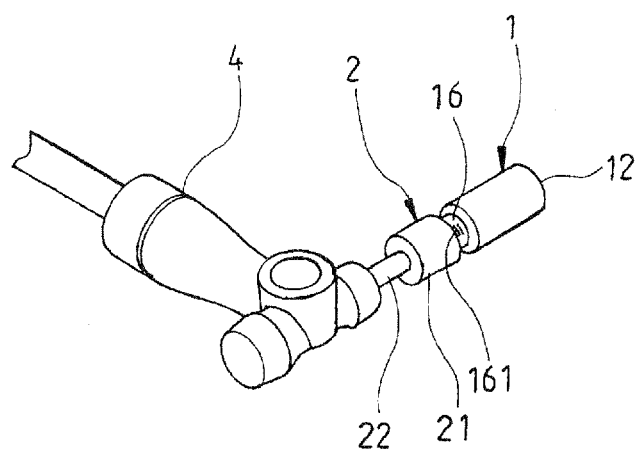
FIG. 5 is an illustration showing a first operational embodiment of the improved pressure relieve valve of the present invention.

FIG. 5 is an illustration exemplarily showing a first operational embodiment of the improved pressure relief valve of the present invention. As shown in the figure, during an operation of use of the present invention, one end of a specialized air pumping connector head 4 can be connected to an air pumping bottle or air compressor. The shaft 22 of the present invention can be attached to another end of the air pumping connector head 4 such that the air outlet 12 of the main body 1 of the pressure relief valve of the present invention can then be attached to an air-filling article including such as tires and the air-filing article can too be maintained at a stabilized filling state.

Figure 6:
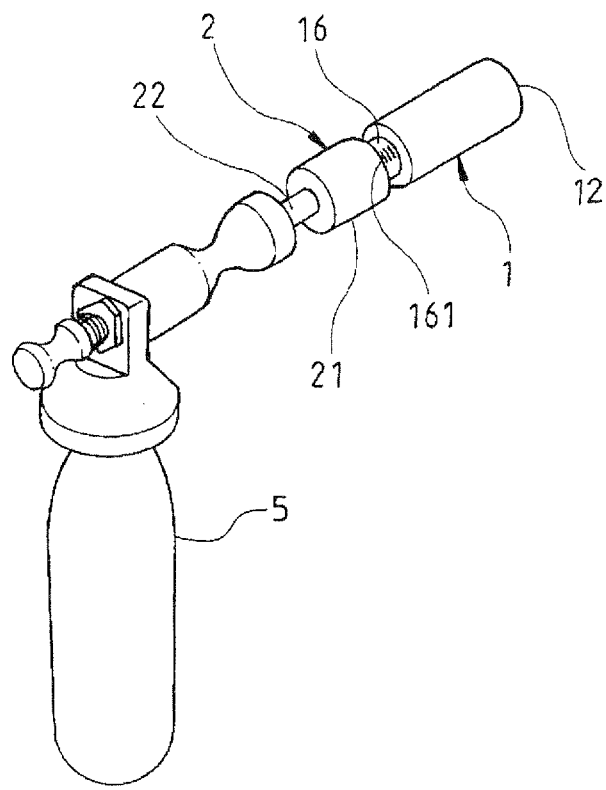
FIG. 6 is an illustration showing a second operational embodiment of the improved pressure relieve valve of the present invention.

FIG. 6 is another illustration exemplarity showing a second operational embodiment of the improved pressure relief valve of the present invention. As shown in the figure, during an operation of use of the present invention, the shaft 22 of the pressure relief valve of the present invention can be attached to a pressurized air bottle 5 such that the air outlet 12 of the main body 1 of the pressure relief valve of the present invention can then be attached to an air-filling article including such as tires and the air-filing article can too be maintained at a stabilized filling state.

Figure 7:
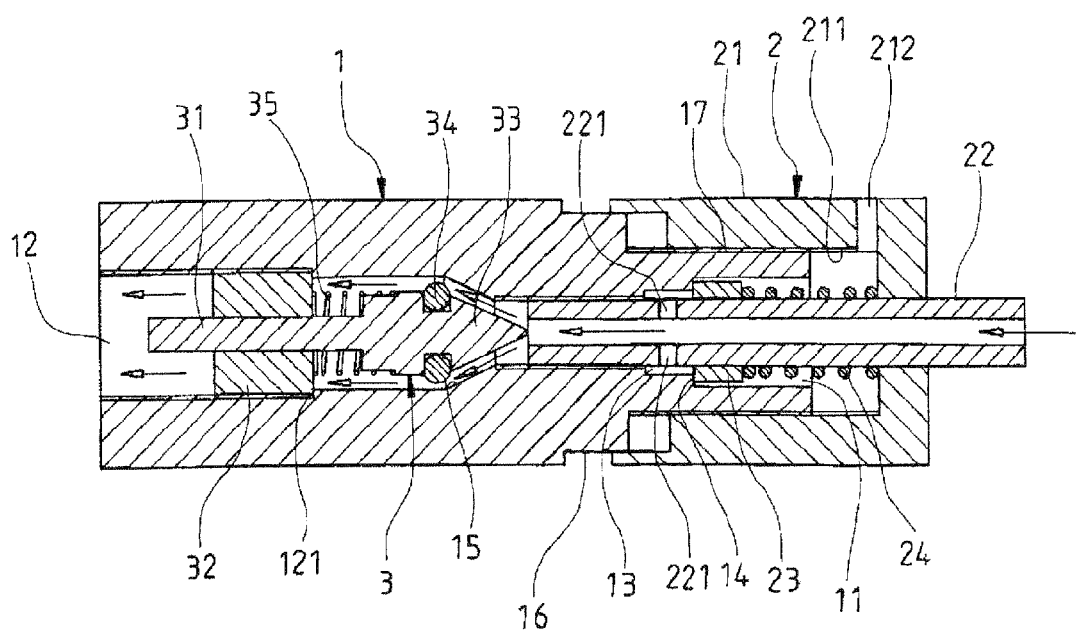
FIG. 7 is an illustration showing an embodiment of the improved pressure relieve valve of the present invention during an air filling thereof.

FIG. 7 is an illustration showing an embodiment of the improved pressure relieve valve of the present invention during an air filling thereof. As shown in the figure, during an operation of use of the present invention, the shaft 22 of the pressure adjustor 22 is connected to an air pumping device and the air outlet 12 is connected to an air-filling article including such as tires. The pressure value of the air-filling article can be set via the pressure adjustor 2, in conjunction with the scale label 161 as well as the rotating sleeve 21. Under a normal condition, the anti-leakage rubber 23 of the pressure adjustor 2 blocks the abutting portion 14 of the main body 1 due to the spring force of the spring 24 such that the air filled by the air pumping device passes through the hollow portion of the shaft 22 and pushes the anti-reverse unit 3 toward the air outlet 12, causing the conical member 33 to disengage from the slanted section 15 in order to form an adequate gap therebetween. Due to the space formed available between the blocker 32 of the anti-reverse unit 3 and the circumference of the air outlet 12, the air is able to pass through said space between the blocker 32 of the anti-reverse unit 3 and the air outlet 12, allowing the air to be released from the air outlet 12 to achieve the air filling of the air-filling article.

Figure 8:
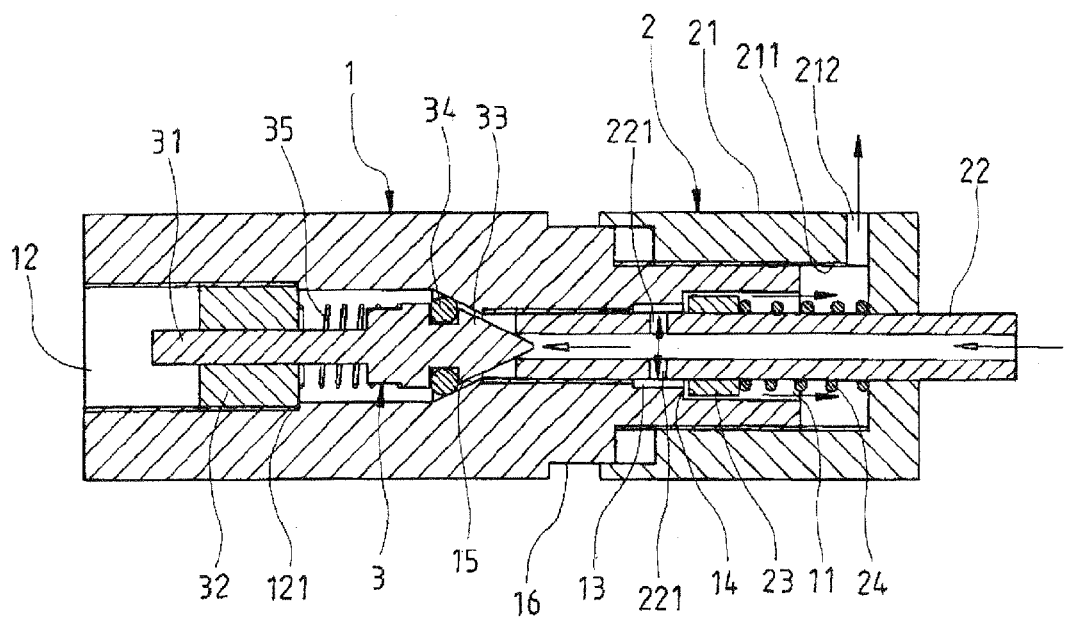
FIG. 8 is an illustration showing an embodiment of the improved pressure relieve valve of the present invention during a pressure relief thereof.

FIG. 8 is an illustration showing an embodiment of the improved pressure relieve valve of the present invention during a pressure relief thereof. As shown in the figure, when the air-filling article reaches the pressure value set initially, the feedback pressure pushes the anti-leakage rubber 23 of the pressure adjustor 2, which causes the abutting portion 14 to disengage from the anti-leakage rubber 23 to form a gap therebetween. The air filled into the shaft 22, therefore, flows back from the through-hole 221, causing the air to be released from the pressure relief perforation 212 of the sleeve 21. In addition, the feedback pressure pushes the conical member 33 of the anti-reverse unit 3 such that it abuts the slanted section 15 of the conduit 13 of the main body 1 and such that the air filled into the shaft 22 is completely blocked from entering into the slanted section 15 in order to maintain the air-filling article at a stabilized filling state.

Figure 9:
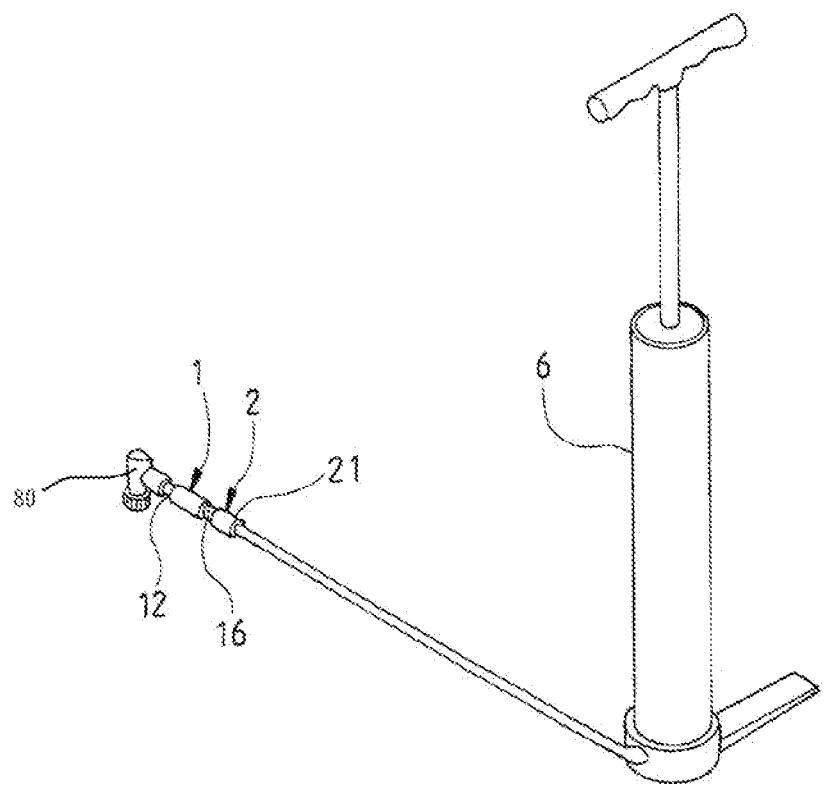
FIG. 9 is an illustration showing a third operational embodiment of the improved pressure relieve valve of the present invention.

FIG. 9 is another illustration exemplarity showing a third operational embodiment of the improved pressure relief valve of the present invention. As shown in the figure, during an operation of use of the present invention, the shaft 22 of the pressure relief valve of the present invention can be connected to one end of a specialized air pumping bottle 6 such that the air outlet 12 of the main body 1 of the pressure relief valve of the present invention can then be attached to an air connector head of an air-filling article including such as tires and the air-filing article can too be maintained at a stabilized filling state.

Figure 10:
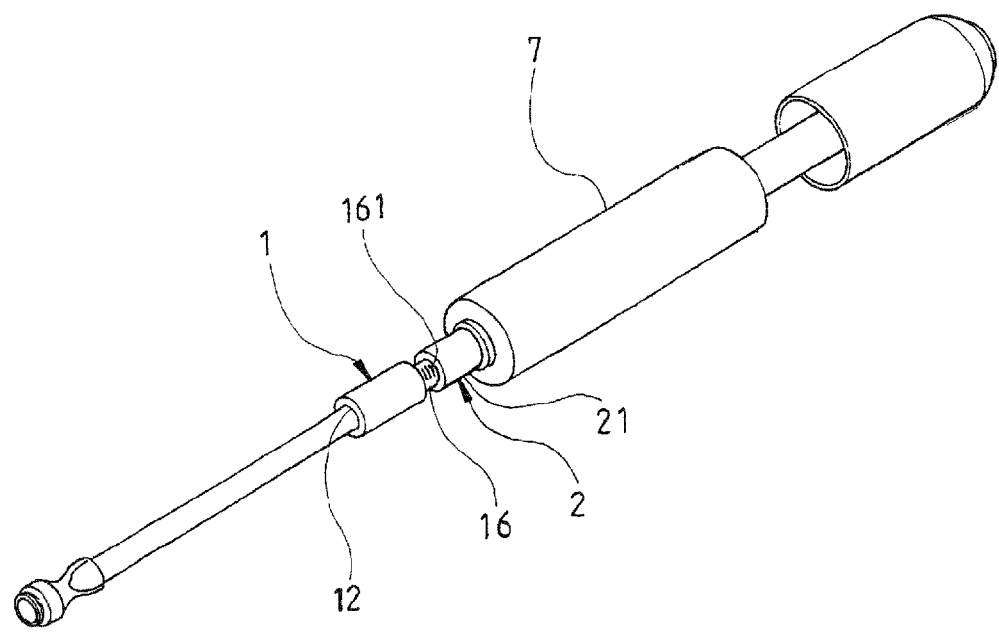
FIG. 10 is an illustration showing a fourth operational embodiment of the improved pressure relieve valve of the present invention.

FIG. 10 is still another illustration exemplarity showing a fourth operational embodiment of the improved pressure relief valve of the present invention. As shown in the figure, during an operation of use of the present invention, the shaft 22 of the pressure relief valve of the present invention can be connected to a specialized portable air pumping bottle 7 such that the air outlet 12 of the main body 1 of the pressure relief valve of the present invention can then be attached to an air connector head of an air-filling article including such as tires and the air-filing article can too be maintained at a stabilized filling state.

Figure 11:
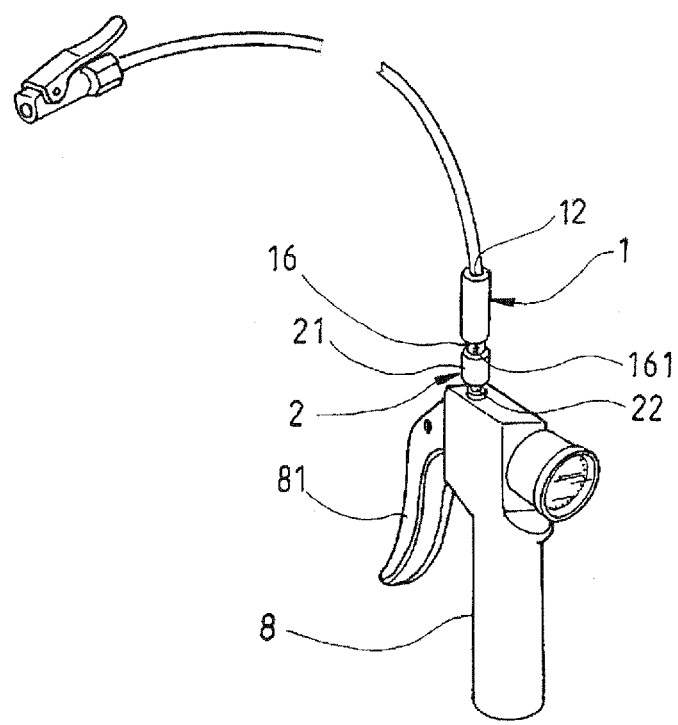
FIG. 11 is an illustration showing a fifth operational embodiment of the improved pressure relieve valve of the present invention.

FIG. 11 is yet still another illustration exemplarity showing a fifth operational embodiment of the improved pressure relief valve of the present invention. As shown in the figure, during an operation of use of the present invention, the shaft 22 of the pressure relief valve of the present invention can be connected to a controller 8 of a control handle 81 of a specialized tool such that the air outlet 12 of the main body 1 of the pressure relief valve of the present invention can then be attached to an air connector head of an air-filling article including such as tires and the controller 8 can be further attached to an air pumping machinery including such as air compressor such that the air-filing article can too be maintained at a stabilized filling state.

What is claimed is:

1. An improved pressure relief valve, comprising:
   a main body, having a mount opening and an air outlet on two ends thereof respectively, a conduit provided between said mount opening and said air outlet;
   wherein an abutting portion is provided at a connecting end between said conduit and said mount opening, and a slanted section in a cone shape is provided at a connecting end between said conduit and said air outlet;
   a pressure adjustor comprising a sleeve; wherein said sleeve comprises a pressure relief perforation, a hollow shaft provided at an internal of said sleeve and having a through-hole penetrating a hollow portion thereof, and an anti-leakage rubber attached to a front edge of said through-hole;
   wherein said shaft passing through a spring is provided between a vertical wall of an inner surface of said sleeve and said anti-leakage rubber; and wherein said sleeve is fastened onto said main body, the shaft is mounted onto said mount opening of said main body and said anti-leakage rubber abuts said abutting portion of said main body such that an attachment portion of said main body is moved laterally in a left/right direction to alter a spring force exerted by said spring onto said anti-leakage rubber in order to adjust a pressure value thereof;
   an anti-reverse unit comprising a shaft penetrating a blocker; wherein said blocker is fastened onto said air outlet of said main body, and another end of said shaft comprises a conical member having an O-shaped ring; and wherein a spring is mounted between said conical member and an elongated member such that said anti-reverse unit is moveable; and
   whereby during an operation of said pressure relief valve, said shaft of said pressure adjustor is fluidly connected to an air pumping device and said air outlet is connected to an air-filling article and said pressure value of said air-filling article is set via said pressure adjustor; and whereby under a first condition, said anti-leakage rubber of said pressure adjustor blocks said abutting portion of said main body and an air filled by said air pumping device pushes said anti-reverse unit in a direction toward said air outlet, forming an adequate gap allowing said air to pass through said anti-reverse unit to fill said air-filling article; and whereby under a second condition, when said air-filling article reaches said pressure value, a feedback pressure pushes said anti-leakage rubber of said pressure adjustor, allowing said air to be released from said pressure relief perforation of said main body and causing said anti-reverse unit to maintain said air-filling article at a stabilized filling state.

2. The improved pressure relief valve according to claim 1, wherein an outer surface of said mount opening of said main body comprises a threaded portion with a relatively smaller diameter, and an inner surface of said sleeve of said pressure adjustor comprises a corresponding screw portion such that said sleeve is fastened onto said screw portion of said main body with said threaded portion thereof and such that said threaded portion is rotated in a clockwise or counterclockwise direction to adjust said pressure value.

3. The improved pressure relief valve according to claim 1, wherein a staged portion is provided between said slanted section and said air outlet of said main body such that as said blocker is fastened onto said air outlet of said main body, said staged portion forms a positioning lock to prevent an overfastening thereof.

4. The improved pressure relief valve according to claim 1, wherein said attachment portion of said main body comprises a scale label such that an adjusted value is visible via said scale label of said attachment portion during an adjustment of said pressure value via said sleeve rotated in a clockwise or counterclockwise direction.

* * * * *